Aug. 7, 1928.

H. T. GOSS 1,679,899

FABRIC MEASURING MACHINE

Filed July 13, 1920    3 Sheets-Sheet 1

Harry T. Goss
Inventor

By his Attorneys
Kerr, Page, Cooper & Hayward

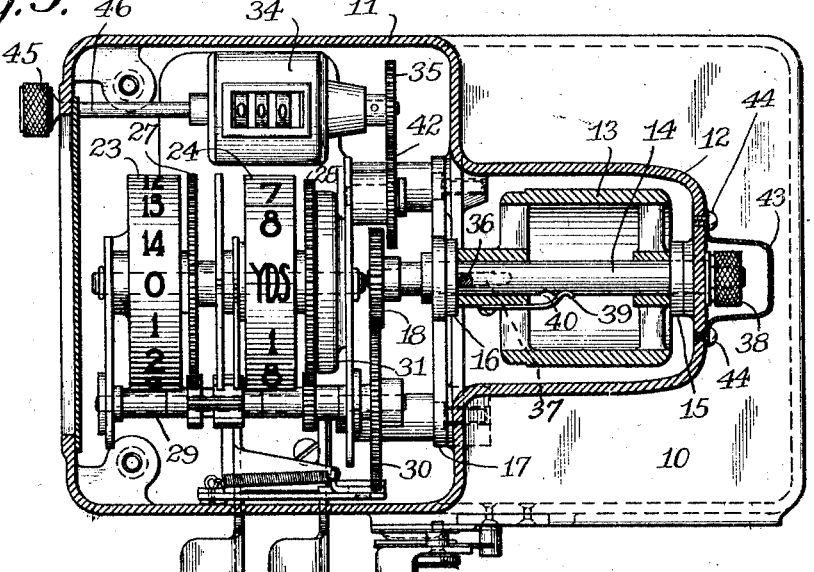
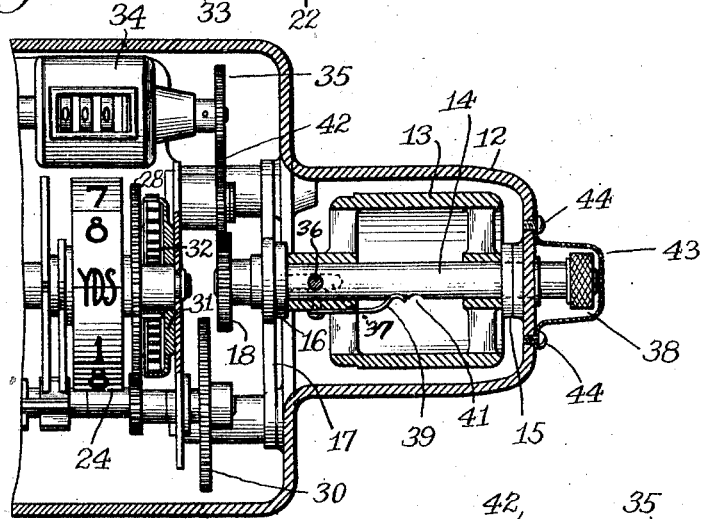
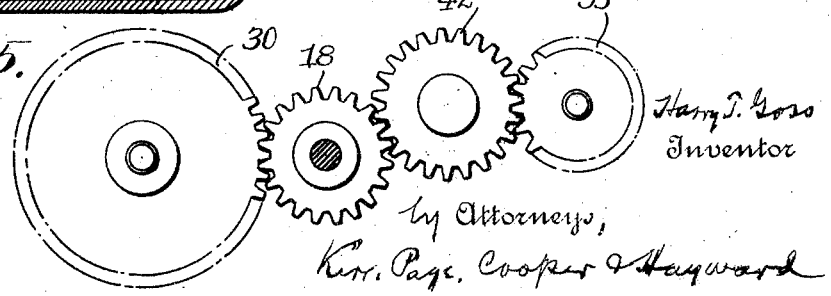

Aug. 7, 1928.  1,679,899
H. T. GOSS
FABRIC MEASURING MACHINE
Filed July 13, 1920   3 Sheets-Sheet 3

Harry T. Goss
Inventor by Attorneys,
Kerr, Page, Cooper & Hayward

Patented Aug. 7, 1928.

1,679,899

UNITED STATES PATENT OFFICE.

HARRY T. GOSS, OF RUTHERFORD, NEW JERSEY, ASSIGNOR TO COZZENS TRADING COMPANY, INC., OF NEW YORK, N. Y., A CORPORATION OF NEW YORK.

FABRIC-MEASURING MACHINE.

Application filed July 13, 1920. Serial No. 395,932.

This invention relates to measuring machines of the type in which cloth or other fabric is passed in contact with a measuring roller to rotate the same, with integrating mechanism to count the rotations of the roller and register the same in linear units and fractions thereof as the corresponding length of the fabric. The chief object of the invention is to provide a machine in which both long and short lengths can be measured, two counters or registers being provided, both actuated from the same measuring roller. The two may be arranged so that either, but not both at once, can be connected to the measuring roller at will. The latter arrangement is specially useful in making inventories, where it is desired to measure the yardage remaining unsold in a bolt of cloth. In such case the long-measuring register is connected to the measuring roller and the cloth is then passed through the machine. The yardage then registered is the amount remaining unsold at the time of the inventory. To these and other ends the invention consists in the novel features and combinations hereinafter described.

The preferred embodiment of the invention as applied to a machine of the type described in the copending application of Frank E. Fitch, Serial No. 382,776, filed May 20, 1920, is illustrated in the accompanying drawings, in which Fig. 1 is a side view of the mechanism, partly in longitudinal section.

Fig. 3 is a plan view, with the measuring roller and the outer casing in horizontal section. In this figure the long-measuring register or counter is shown disconnected from the measuring roller and the short-measuring register connected therewith.

Fig. 4 is a detail plan view, similar to Fig. 3 but showing the long-measuring register or counter connected with the measuring roller and the short-measuring register disconnected therefrom.

Fig. 5 is an elevational view of the gearing (shown in Fig. 3) by which the measuring roller is connected to the long-measuring register or to the short-measuring register at will.

Figure 1:
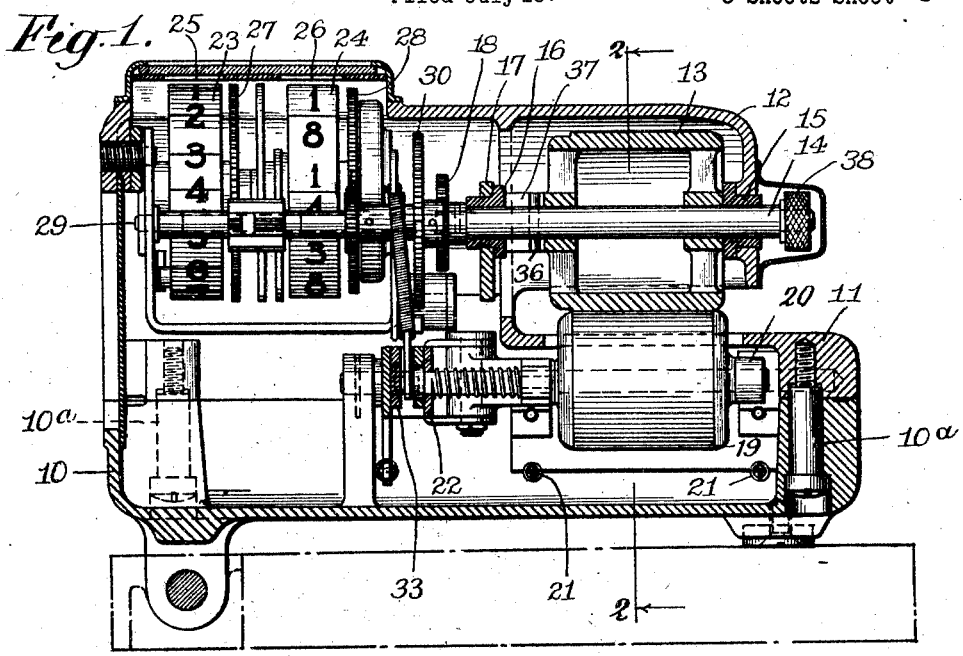

The operative parts of the machine illustrated are enclosed in a housing composed of a flat base 10 in the form of a shallow receptacle, and a cover portion 11 having at one end a vertical part provided with a horizontal extension 12 overlying the base. The said vertical part contains the registering mechanisms, the extension contains the measuring roller, and the base contains the remaining parts, including the cramp roller and the finger keys by which the operation of the machine is controlled. The two parts of the housing are held together by screws 10ª, Fig. 1, so that when the latter are removed, the upper portion can be lifted off, carrying with it the measuring roller and registering mechanisms, and exposing the cramp roller and controlling keys in the base. All parts are thus readily reached for inspection, cleaning, repair, replacement, etc.

The measuring roller 13, which has its surface suitably roughened for firm engagement with the cloth, is mounted on and rotates a shaft 14 mounted in a bearing 15 (Figs. 1 and 3) in the outer end-wall of the extension 12, and in a bearing 16 carried by a strip or plate 17 arranged across the inner end of the extension. On the inner end of the shaft is a gear 18, by which the rotation of the roller is communicated to the registering mechanism or mechanisms, as hereinafter described.

Figure 7:
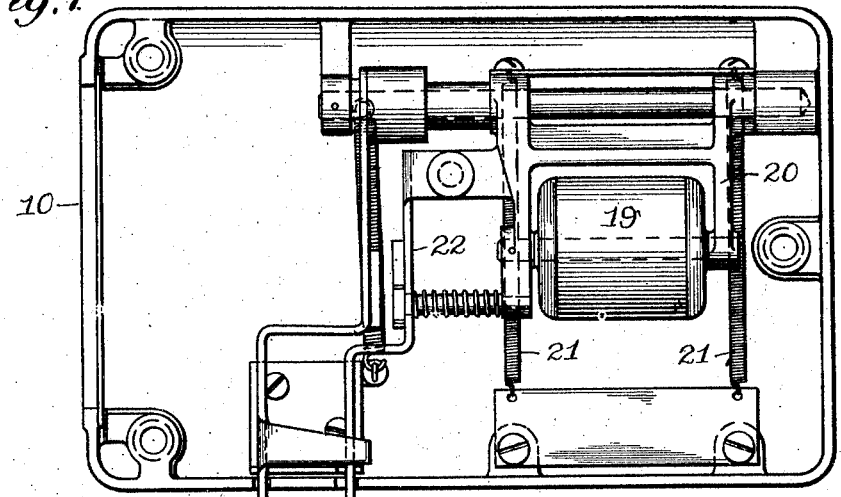
Fig. 7 is a plan view of the lower part of the outer casing, showing the cramp roller and actuating mechanism therefor.
Figure 8:
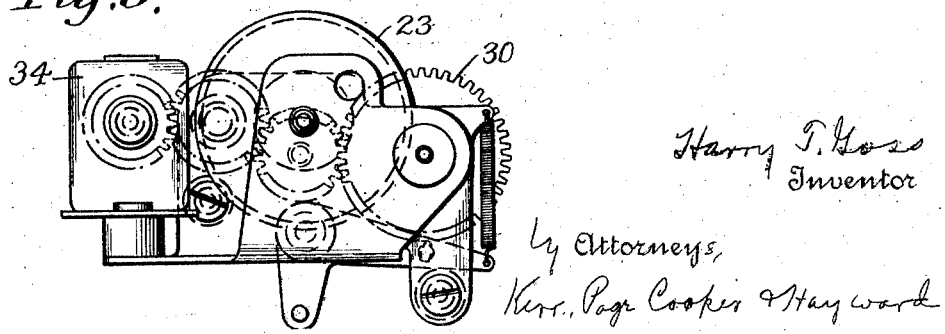
Fig. 8 is an end view of the long and short measuring registers, from the left of Fig. 3.

The cramp roller 19 is journalled in a pivoted frame 20, Fig. 7, swung upwardly by a pair of coil springs 21 to hold the roller in co-operation with the measuring roller 13. The frame is swung down, to lower the cramp roller and thereby permit easy insertion of the cloth between the two, by means of a finger key or lever 22.

The short-measuring register is arranged at the center of the vertical portion of the upper half of the housing, and comprises a units dial 23 and a fractions dial 24, read through openings 25, 26, respectively. Any desired units and fractions may be used, as for example yards and eighths, as shown, or meters and tenths, etc. The dials are actuated by gears 27, 28, driven from a counter-shaft 29, which at its inner end is equipped with a gear 30 for rotation from the shaft 14, as for example by the gear 18, Figs. 1, 3 and 4. Inasmuch as counting or registering mechanisms are well known, further explanation thereof is unnecessary. Suffice it to say that in the machine illustrated the gear ratios of the driving train are such that each complete revolution of the measuring roller advances the fractions dial one-eighth of a turn and that each complete revolution of the fractions dial advances the units dial one step, in the present instance one step being one-fifteenth of a turn. The short-measuring register thus registers up to fifteen yards in eighths of a yard. Alongside of the gear 28 is a spring-barrel 31, containing a spring 32 (Fig. 4) by which the numeral dials are rotated back to zero after each measuring operation. As in Fitch application mentioned above, provision is made whereby depression of key 22, to lower the clamp roller and release the cloth, locks the register with the measurement displayed through the sight openings 25, 26, so that when the other key, 33, is depressed the register is unlocked and is returned to zero by the spring 32.

The long-measuring register 34 is arranged alongside of the other and is actuated by a gear 35.

In the machine illustrated in Figs. 1 to 5 the measuring roller is operatively connected to shaft 14 by means of a pin 36 extending into slots 37 in the hub of the roller, so that the shaft can be shifted axially a limited distance, as will be readily understood. To effect this adjustment the outer end of the shaft is extended through the casing wall and is provided with a knurled knob 38. A light spring finger 39, Figs. 3 and 4, fixed on the measuring roller hub, engages one or the other of a pair of notches 40, 41, in the shaft, to hold the shaft yieldingly in outer or inner position as the case may be.

For short-measuring the shaft is in its inner position, Fig. 3, in which the gear 18 is in mesh with gear 30. For long measuring, the shaft is pulled out, as in Fig. 4, thus shifting gear 18 out of mesh with gear 30 and into mesh with gear 42, which is constantly in mesh with gear 35. Rotation of the measuring roller now drives the long-measuring register, as desired in inventory work, for example, but does not actuate the short-measuring register. To minimize the possibility of unauthorized adjustment of the shaft, the knob 38 is protected by a cover 43 held in place by screws 44, which must be taken out to remove the cover and afford access to the knob. The long register 34 can be returned to zero by rotating knob 45 on shaft 46, at the rear of the casing.

It will be seen that in the machine illustrated the two registers are never driven simultaneously by the movement of the fabric under the measuring roller. On the contrary only one register is actuated by the measuring operation. In the machine of Figs. 1 and 3 the long or the short-measuring register is actuated, according to the position of shaft 14.

Figure 2:
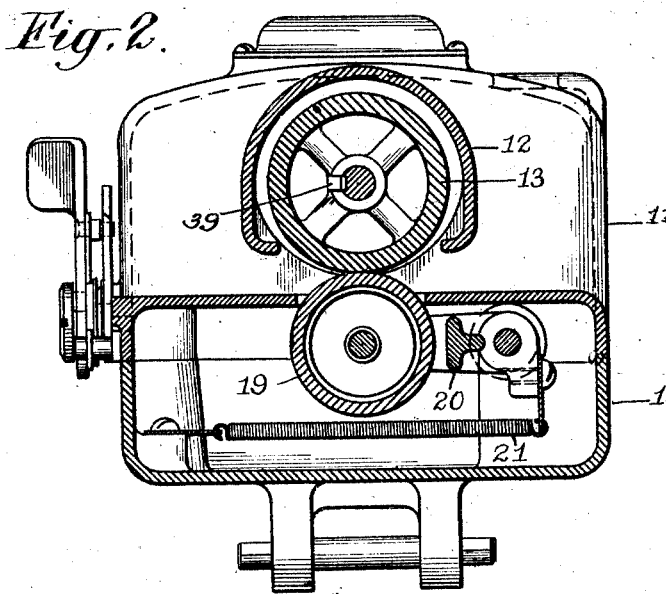
Fig. 2 is a cross section on line 2—2 of Fig. 1.
Figure 6:
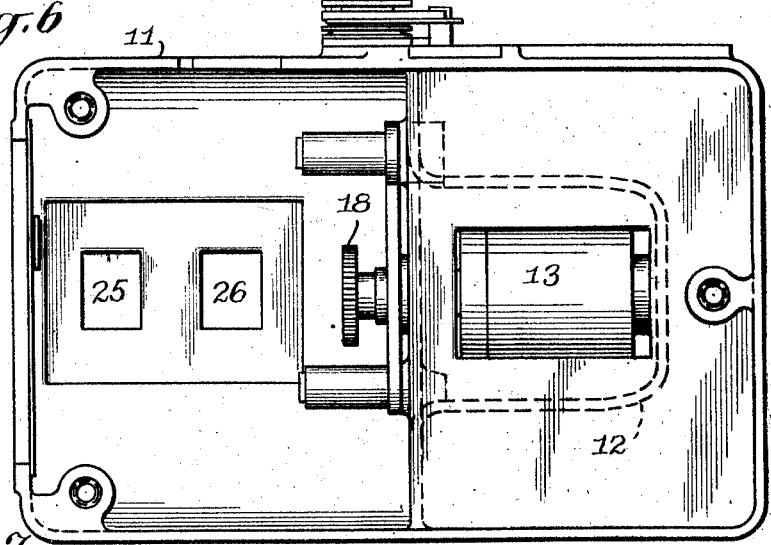
Fig. 6 is an under plan view of the upper part of the outer casing.

In using the machine illustrated in Figs. 1 to 5 inclusive, the operator first separates the rollers 13, 19, by depressing key 22, which rocks the frame 20, Fig. 2, and thereby swings cramp roller 19 down and locks it to admit the cloth. The latter being adjusted, key 33 is depressed, which releases the cramp roller, whereupon the measuring roller will be rotated as the cloth is drawn between the two. If now the shaft 14 is in its inner position, as in Fig. 3, gear 18 is in mesh with gear 30 and hence the short-measuring register is actuated, so that the length of the cloth is registered on dials 23, 24. On the other hand, if the shaft 14 is in its outer position, as in Fig. 4, gear 18 is in mesh with gear 42, thereby causing the length to be registered on register 34.

It is to be understood that the invention is not limited to the specific constructions herein illustrated and described, but can be embodied in other forms without departure from its spirit.

I claim:

1. In a fabric measuring machine, the combination with a measuring roller, of a short-measurement register, a long measurement register, and means for connecting either mechanism, but not both to the measuring roller for actuation thereby.

2. In a fabric measuring machine, the combination with a measuring roller, of a plurality of measurement-registering mechanisms, each having an actuating gear, a gear driven by the measuring roller, and means for shifting the last mentioned gear into mesh with any one of the actuating gears but not with all simultaneously.

3. In a fabric measuring machine, the combination with a long measuring register having an actuating gear, and a short-measuring register having an actuating gear, of a measuring roller, an axially shiftable driving gear rotated by the said roller, and means for shifting the driving gear out of mesh with either of said actuating gears and simultaneously into mesh with the other.

4. In a fabric measuring machine, the combination with a long measuring register having an actuating gear, and a short measuring register having an actuating gear, of a shiftable driving shaft, a driving gear fixed thereon, a measuring roller connected with the shaft to rotate the same, and means for shifting the driving shaft to carry the driving gear out of mesh with either actuating gear and into mesh with the other.

5. In a fabric measuring machine, the combination with a long measuring register having an actuating gear, and a short measuring register having an actuating gear, of an axially shiftable driving shaft, a driving gear fixed thereon, an axially stationary measuring roller mounted on the shaft to rotate the same, and means for shifting the driving shaft through the measuring roller to carry the driving gear out of mesh with either actuating gear and into mesh with the other.

6. In a fabric measuring machine, the combination with a measuring roller, of a long-measuring register, a short-measuring register, and mechanism, including shiftable gear-means, for driving either but not both simultaneously, from the measuring roller.

In testimony whereof I hereunto affix my signature.

HARRY T. GOSS.

CERTIFICATE OF CORRECTION.

Patent No. 1,679,899.                  Granted August 7, 1928, to

HARRY T. GOSS.

It is hereby certified that error appears in the printed specification of the above numbered patent requiring correction as follows: Page 2, line 18, strike out the word "As" and insert the words "Preferably as", and line 20, for the word "clamp" read "cramp"; and that the said Letters Patent should be read with these corrections therein that the same may conform to the record of the case in the Patent Office.

Signed and sealed this 9th day of October, A. D. 1928.

(Seal)                                          M. J. Moore,
                                                  Acting Commissioner of Patents.